United States Patent [19]

Wlodarczyk

[11] Patent Number: 5,390,546
[45] Date of Patent: Feb. 21, 1995

[54] FIBER OPTIC DIAPHRAGM SENSORS FOR ENGINE KNOCK AND MISFIRE DETECTION

[76] Inventor: Marek T. Wlodarczyk, 6865 Vachon Dr., Bloomfield Hills, Mich. 48301

[21] Appl. No.: 86,245

[22] Filed: Jul. 1, 1993

[51] Int. Cl.⁶ .................................................. G01L 7/08
[52] U.S. Cl. ........................................ 73/715; 73/116; 250/231.19
[58] Field of Search .............. 73/118.1, 116, 117.3, 73/715

[56] References Cited

U.S. PATENT DOCUMENTS

| | | | |
|---|---|---|---|
| 4,293,188 | 10/1981 | McMahon | 385/13 |
| 4,521,683 | 6/1985 | Miller | 73/705 |
| 4,620,093 | 10/1986 | Barkhoudarian et al. | 250/231.19 |
| 4,753,109 | 6/1988 | Zabler | 73/115 |
| 4,781,059 | 11/1988 | Susuki et al. | 73/117.3 |
| 4,919,099 | 4/1990 | Extance et al. | 123/425 |
| 4,924,870 | 5/1990 | Wlodarczyk | 128/667 |
| 4,932,262 | 6/1990 | Wlodarczyk | 73/705 |
| 4,932,263 | 6/1990 | Wlodarczyk | 73/705 |
| 5,052,214 | 10/1991 | Dils | 73/35 |
| 5,072,617 | 12/1991 | Weiss | 73/715 |

FOREIGN PATENT DOCUMENTS

| | | |
|---|---|---|
| 0392650 | 10/1990 | European Pat. Off. |
| 1291996 | 6/1961 | France ........... 73/715 |
| 1024266 | 2/1958 | Germany ....... 73/715 |
| WO8911031 | 11/1989 | WIPO . |

OTHER PUBLICATIONS

"Microbending Losses of Metal Coated Single Mode . . . "; Society of Photooptical Instrumentation Engineers; vol. 985, (1988).

"A Fiber Optic Sensor for Combustion Pressure Measurement . . . "; Society of Photooptical Instrumentation Engineers; vol. 840, (1987).

Primary Examiner—Hezron E. Williams
Assistant Examiner—James M. Olsen
Attorney, Agent, or Firm—James M. Deimen

[57] ABSTRACT

The modulation depth of a fiber optic diaphragm sensor is increased by tapering the tip end of the optical fiber or fiber bundle. In a second embodiment, the modulation depth is increased by mechanically leveraging the diaphragm movement relative to the tip end of the optical fiber or fiber bundle. In either embodiment, the operating temperature of the tip end of the optical fiber or fiber bundle can be reduced relative to the operating temperature of the diaphragm. Thus, the diaphragm sensor can be directly exposed to combustion temperatures in an internal combustion engine and advantageously the sensor can be embodied in a spark plug adjacent the electrodes.

7 Claims, 6 Drawing Sheets

FIBER OPTIC DIAPHRAGM SENSORS FOR ENGINE KNOCK AND MISFIRE DETECTION

BACKGROUND OF THE INVENTION

The field of the invention pertains to fiber optic sensors instantaneously sensitive to pressure or stress in a manner that causes a beam of light to be reflectively modulated in response to changes in pressure or stress on the sensor.

In particular, in the automotive field, the ability to continuously monitor internal combustion engines for pressure fluctuations can significantly improve engine efficiency, performance, reliability and operating costs. Most importantly, the level of emissions can be reduced over the 100,000 mile effective life of the engine emissions control systems to be required by the United States Environmental Protection Agency. In addition, open and closed loop controls based on pressure information permit lean-burn engine operation, a wider tolerance to fuel octane and acceptance of alternative fuels.

Two combustion parameters, engine knock and misfire, have a particularly significant effect on overall engine performance. Combustion knock causes increased fuel consumption, reduced engine torque and engine deterioration if left uncorrected. Eventually severe damage such as perforated pistons can occur.

Misfire can result in catalyst damage and degradation that eventually cause vehicle exhaust emissions to no longer meet current or proposed emission standards. With a design 100,000 mile catalyst life, the failure to detect and correct misfire could result in operation of the vehicle for a lengthy period of time, possibly many years, with an ineffective catalyst.

The California Air Resources Board has recently proposed regulations which will require vehicles to be equipped with on-board emission monitoring systems. Such systems, in particular, will require misfire monitoring. The Environmental Protection Agency is also considering regulations to require such monitoring systems.

A low cost, reliable cylinder-selective combustion pressure sensor would permit knock and misfire detection separately for each cylinder. In addition to signalling the malfunction to the vehicle operator, a real time solid state engine control could adjust specific cylinder parameters to correct for the malfunction. The majority of the presently available or proposed knock and misfire detection techniques provide information that is not cylinder specific and therefore has limited utility for real time corrective controls. However, some recent patents disclose cylinder specific sensors. These sensors generally fall into two categories, luminosity detectors and pressure detectors.

U.S. Pat. No. 4,919,099 discloses a probe insertable into the engine cylinder combustion chamber. The probe includes a light conductive rod and fiber optic transmission bundle connected to an opto-electronic detector for instantaneous detection of the luminosity of the combustion gases within the combustion chamber. U.S. Pat. No. 5,052,214, in a similar manner, utilizes a fiber optic probe and transmission cable to sense and transmit the instantaneous luminosity to an opto-electronic detector. International Application Publication WO 89/11031 and European Application Publication EP-392-650-A also disclose optical luminosity probes for engine combustion chambers.

U.S. Pat. No. 4,781,059 discloses an optical fiber pressure sensor comprising a plurality of fibers to transmit light to the sensor tip and a second plurality of fibers to transmit light from the tip to an opto-electronic detector. The tip comprises a reflective diaphragm sensitive to pressure changes within the combustion chamber. U.S. Pat. No. 4,924,870 to applicant discloses an optical fiber pressure sensor tip comprising a single optical fiber. The single fiber carries dual light beams of differing wavelengths as input and the reflected return light beams. One wavelength serves as a reference signal that is reflected by an optical filter. The other wavelength passes through the optical filter and is reflected and modulated by a movable diaphragm sensitive to pressure changes. This particular fiber optic sensor is of very small size, being intended for the measurement of intra-vascular blood pressure in human patients.

Two other patents to the applicant, U.S. Pat. No. 4,932,262 and U.S. Pat. No. 4,932,263, disclose a well having an optical fiber passing therethrough. A pressure sensitive membrane encloses at least a portion of the well. The underside of the pressure sensitive membrane includes an optical grating that couples with the wavelength of the light beam in the optical fiber so as to modify the light beam in response to pressure induced movement of the membrane. By making the sensor with techniques common to the manufacture of integrated circuits on chips, the sensor may be made small and rugged enough to locate on a spark plug in direct exposure to the combustion chamber of an engine.

A published paper co-authored by the applicant is entitled "Microbending Losses of Metal Coated Single Mode, Multimode, and Cladding-Free Fibers," Society of Photo-Optical Instrumentation Engineers, Vol. 985 Fiber Optic and Laser Sensors VI (1988) and discloses the test results of microbending various optical fiber constructions. The test results indicate the various attenuations of light beams as a function of microbending displacement of the fibers and wavelength of the light beams.

A second published paper co-authored by the applicant is entitled "A Fiber Optic Sensor for Combustion Pressure Measurement in a Washer Configuration," Society of Photo-Optical Instrumentation Engineers, Vol. 840 Fiber Optic Systems for Mobile Platforms (1987), and discloses a washer configuration for placement between a spark plug and engine cylinder head. Changes in combustion chamber pressure cause changes in the preload on the washer configuration. The washer configuration comprises upper and lower serrated washer halves with a continuous loop of optical fiber placed between the serrated washer halves. One end of the loop extends to a source of light and the other end of the loop extends to a photodetector.

SUMMARY OF THE INVENTION

The configuration of the fiber optic diaphragm sensor permits direct exposure of the diaphragm to the combustion chamber and therefore the sensor directly senses the pressure fluctuations in the chamber. This is distinguished from washer-type sensors which are located under spark plugs or bolt heads and therefore indirectly monitor combustion pressure. Direct exposure sensors tend to provide improved signal to noise ratio, in particular at low pressures, and therefore offer better performance. The direct exposure, however, subjects the sensor, in particular, the diaphragm at the tip to the instantaneous temperatures in the combustion chamber. In the preferred embodiment below the diaphragm sensor is embodied in the spark plug thus eliminating any need to modify the engine otherwise.

The invention comprises means to increase the modulation depth of the fiber optic diaphragm sensor and decrease the operating temperature of the tip of the fiber within the sensor. In one embodiment the tip of the fiber is tapered to one fourth the fiber radius. In the other embodiment the fiber tip is spaced from the diaphragm and the movement of the diaphragm mechanically leveraged. In either embodiment the fiber may compromise a bundle of optical fibers with taper formed by fusing and drawing the end of the bundle.

DESCRIPTION OF THE PREFERRED EMBODIMENTS

Figure 1:
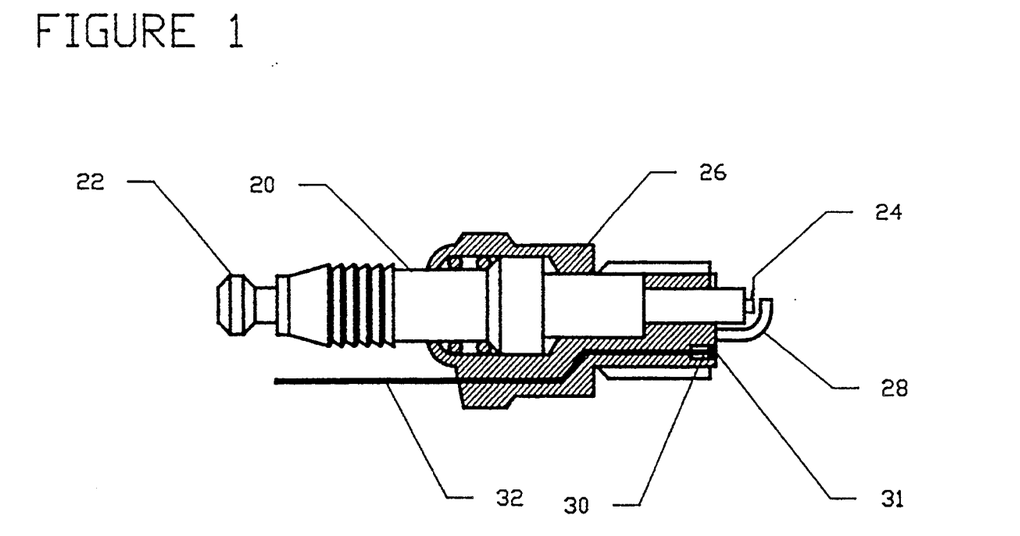
FIG. 1 is a side cross-section of a spark plug, incorporating a diaphragm fiber optic sensor.
Figure 2:
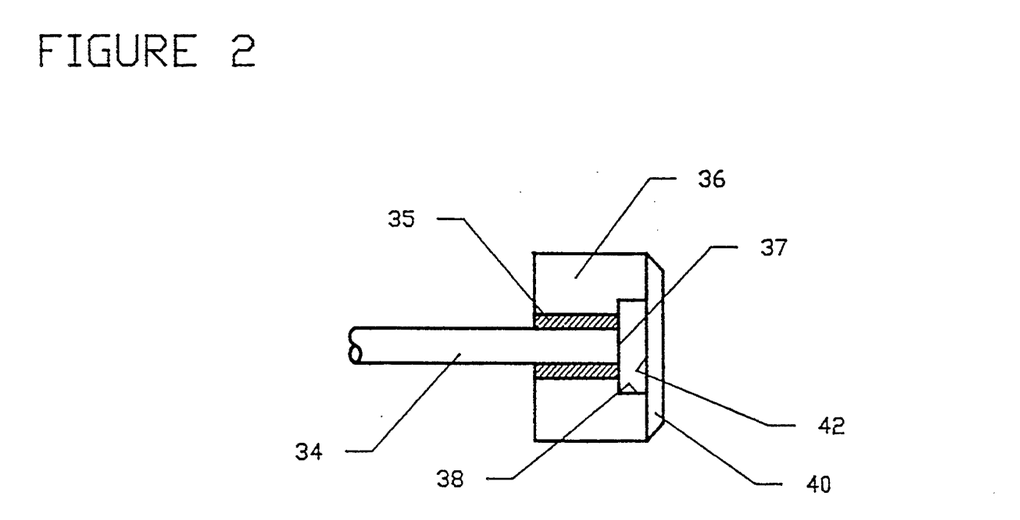
FIG. 2 is a typical cross-section of a diaphragm type fiber optic sensor.

In FIGS. 1 and 2 the spark plug shown includes a conventional ceramic core 20 that contains a conductor 22 leading to the center pole 24. The ceramic core 20 is permanently affixed in a metal sleeve 26 to which is attached the other pole 28. In the typical conventional spark plug the ceramic core 20 is concentric with the metal sleeve. However, as shown in FIG. 1 the core 20 is radially offset from the centerline of the sleeve. The offset provides additional metal thickness in the sleeve 26 for a sensor 30 and fiber optic transmitting cable 32 leading to the sensor.

The sensor 30 is located in a small bore or cavity in the metal sleeve with the sensor tip exposed 31 to combustion pressure and temperature adjacent the poles 24 and 28 of the spark plug. A simple form of a diaphragm sensor is illustrated in FIG. 2. The fiber 34, which may be a fiber bundle, is fitted within a sensor body 36 and terminates at a small round cavity 38. A ferrule 35 surrounds the tip end 37 of the fiber 34. The diaphragm 40 covers the cavity 38. The diaphragm 40 is mirror finished 42 on the cavity side. The light delivered by the fiber 34 to the sensor 30 is reflected back into the fiber 34 by the mirror finish 42 on the back of the diaphragm. Thus the amount of light reflected by the diaphragm 40 back into the fiber 34 increases and decreases with increases and decreases in pressure on the diaphragm.

Increased pressure on the diaphragm 40 causes the diaphragm to flex into the cavity 38 and in so doing the light reflected back is modulated. The very small diaphragm detector 30 shown as inserted in the spark plug of FIG. 1 is subjected to the extreme of combustion temperature in close proximity to the poles 24 and 28. Therefore, the tip of the glass fiber 34 is subjected to potentially damaging temperatures and therefore a degradation of signal to noise ratio. Thus, even though the sensor need not be calibrated against pressure or temperature since only relative measurements are required for knock or misfire identification, a good signal to noise ratio is important.

Figure 3:
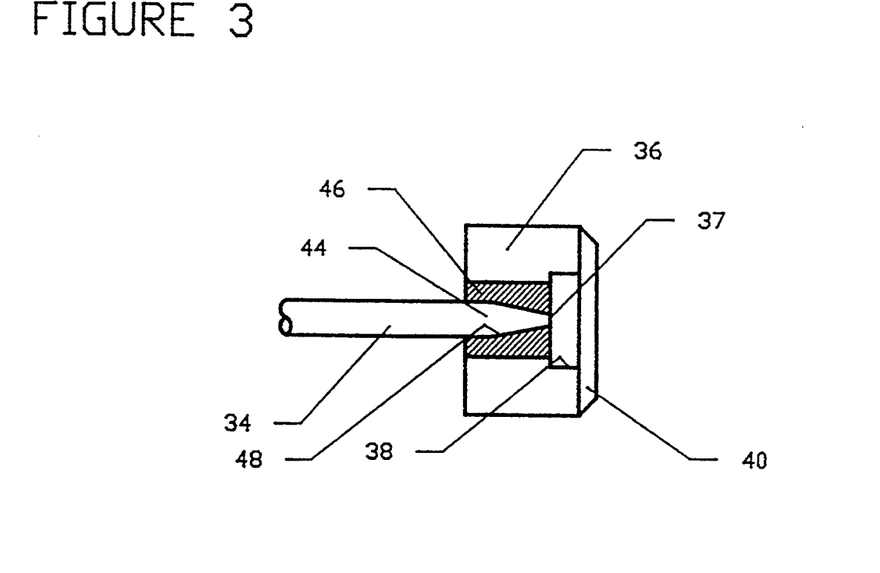
FIG. 3 is an illustration of the tapered end of an optical fiber.

A diaphragm sensor should also have a large band width and low cost. Because of the small size of the diaphragm sensor in a spark plug and overpressure requirements, diaphragm deflection is quite small, on the order of 15 microns. This small deflection limits optical modulation and consequently signal to noise ratio and system frequency response. FIG. 3 illustrates the first of two improvements in a diaphragm sensor that significantly increase the signal to noise ratio without significantly increasing sensor cost. In a diaphragm sensor as pressure increases, the diaphragm is deflected inward toward the tip end of the optical fiber. The amount of light collected by the tip end of the fiber, after reflection from the diaphragm, increases monotonically with pressure.

For a given sensor size and diaphragm thickness, optical modulation depth can be increased through a suitable selection of fiber core diameter and numerical aperture (NA). The numerical aperture dependence is almost linear and the sensor size dependence is approximately linear with an inverse of fiber diameter. Thus, maximum modulation can be obtained for fibers with small diameters and large NA. A high NA also favors the optical power carrying capability of the fiber, which is a function of the square of the NA. However, reduced fiber diameter reduces power level by a square function of the diameter.

For example, modulation levels of 3 mm diameter sensors range between 8% and 12%, based on the use of a 100 micron thick diaphragm and a 100 micron diameter 0.29 NA fiber. Typical signal to noise ratios are in the range of 100 to 200 for such sensors when energized by a relatively low cost opto-electronic transceiver.

Figure 4:
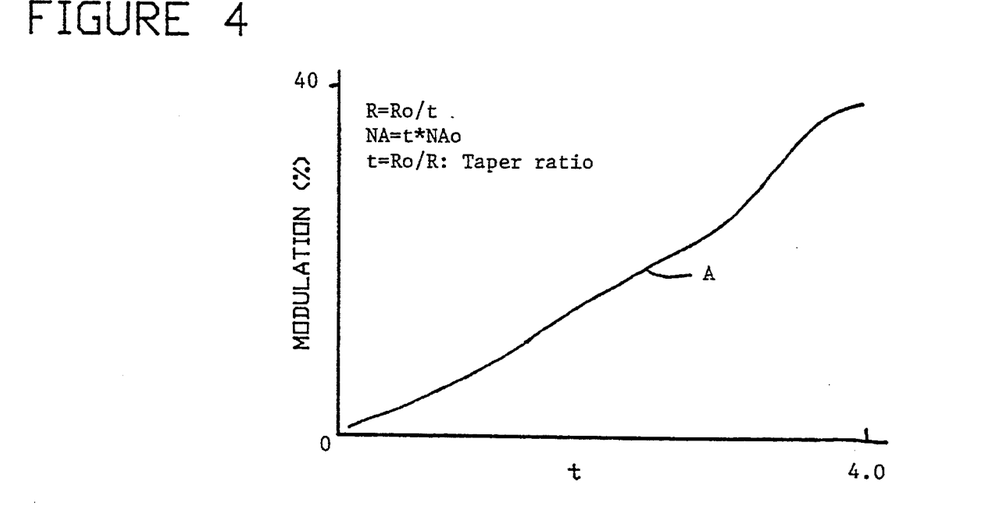
FIG. 4 is a graph of modulation depth increase versus taper ratio for the tapered fiber of FIG. 3.

In FIG. 3 the fiber or fiber bundle 34 is tapered 44 within the conical ferrule 46. The conical taper 44 adjacent the tip end 37 results in both a size reduction and an increase in NA for the tip end. The increase in NA is approximately proportional to the ratio of untapered to tapered fiber tip end diameters. FIG. 4 illustrates the theoretical difference between the modulation depth and the taper ratio by the curve A. An improvement in modulation depth approaching 40% can be obtained by drawing down the fiber 34 to a taper ratio of 4 to 1.

While the fiber conical taper 44 adjacent the tip end 37 increases the modulation depth significantly, the transmission losses also increase due to the leakage of higher-order guided modes in the tapered region of the fiber. These transmission losses can be significantly reduced by plating a thin layer 48 of reflective metal onto the taper surface. By the selection of a suitable metal, such as gold, the metal layer serves as an interface bonding material for brazing the conical ferrule 46 to the fiber.

Figure 5:
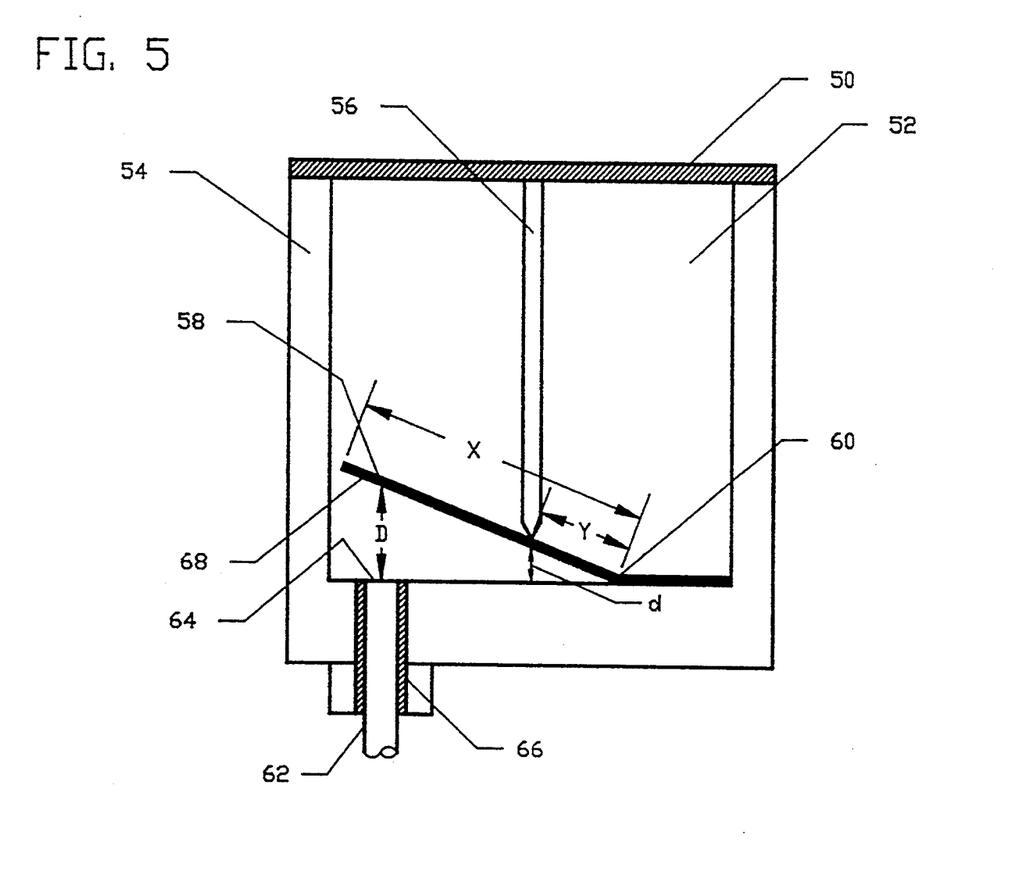
FIG. 5 is an illustration of a mechanically leveraged dual diaphragm sensor structure.

In FIG. 5 an alternative improvement to the diaphragm sensor not only increases modulation depth but also spaces the tip end of the optical fiber a significantly greater distance from the diaphragm exposed to the heat in the cylinder combustion chamber adjacent the spark plug electrodes. Specifically, the mechanical diaphragm 50 is mounted over the cavity 52 opening in the sensor body 54. Within the cavity 52 is a transfer pin 56 mechanically connected to the center of the diaphragm 50 where maximum diaphragm deflection occurs. An optical diaphragm 58 is hinged at a fulcrum location 60 and urged against the transfer pin 56 by the resistance to bending of the optical diaphragm at the fulcrum location.

Figure 6:
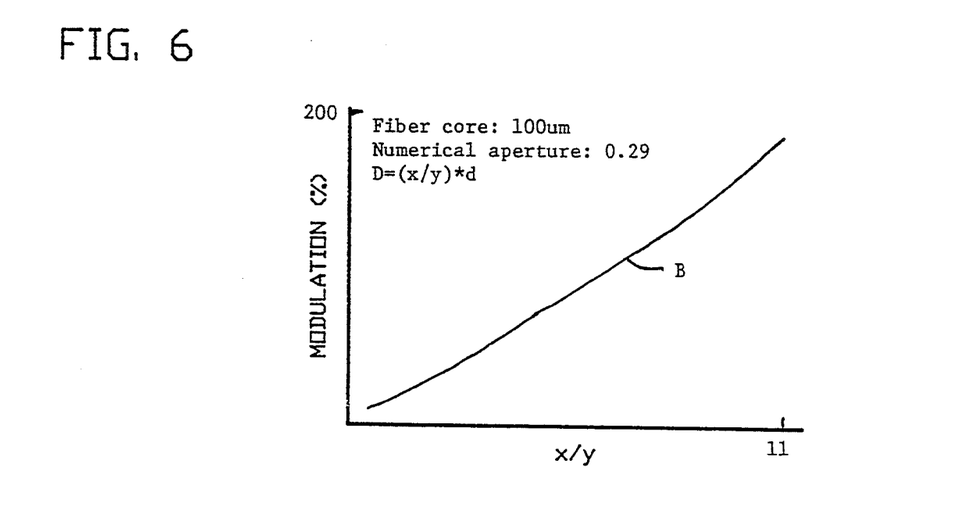
FIG. 6 is a graph of modulation depth increase versus leverage ratio for the sensor structure of FIG. 5.

An optical fiber or fiber bundle 62 penetrates the sensor body 54 with the tip end 64 in optical communication with the cavity 52. A ferrule 66 seals the optical fiber 62 to the sensor body 54. The tip end 64 is spaced from the fulcrum 60 a considerable distance more than the engagement of the transfer pin 56. The side 68 of the optical diaphragm 58 facing the tip end 64 is reflective to efficiently return light to the optical fiber 62. Thus, displacement of the mechanical diaphragm 50 in response to pressure changes in the combustion chamber causes displacement of the optical diaphragm 58 about the fulcrum 60 and significantly increased displacement of the optical diaphragm relative to the tip end 64 of the optical fiber 62. In FIG. 6, the curve B illustrates the modulation depth increase versus the leverage ratio defined as the total length (X) of the optical diaphragm 58 from the fulcrum 60 to the distance (Y) of the transfer pin 56 to the fulcrum 60 along the optical diaphragm 58. In FIG. 6 the results for a 3 mm transfer pin 56 and 3 mm diameter sensor body 54 are presented. For a mechanical diaphragm 50 deflection of 20 microns, the optical diaphragm 58 moves about 200 microns at an X/Y leverage ratio of 10:1. The result is a modulation depth increase of about 160%.

Depending on the length of the transfer pin 56, temperatures up to 800° C. adjacent the mechanical diaphragm 50 may be accommodated. The separation of the mechanical and optical diaphragm functions lessens or removes a critical design aspect present with conventional diaphragm-based fiber optic pressure sensors. The separation increases the modulation levels and decreases the fiber 62 temperature at the tip end 64 and ferrule 66.

Usually the choice of diaphragm is a compromise between diaphragm strength and diaphragm reflectivity. High diaphragm reflectivity and reflectivity stability under high temperatures are the primary requirements for sensitive and stable diaphragm sensors. Materials with such reflective characteristics such as platinum, have relatively low strength and therefore can limit operating pressure ranges. Inconels and special grades of stainless steels are usually the best compromises.

By separating the diaphragm functions in the new design, the mechanical diaphragm 50 selection is based on mechanical characteristics such as high strength, large deflection and hysteresis-free operation under conditions of high temperatures and pressures. Thus, any metal or alloy possessing the necessary characteristics but without regard to reflectivity might be selected.

The optical diaphragm 58, however, may be selected on the basis of best reflectivity and ability to repeatedly flex about the fulcrum 60 the slight amount under displacement by the transfer pin 56. Thus, platinum is a particularly good choice for the optical diaphragm material.

The fiber tip 64 and ferrule 66 temperature can be controlled by the selection of the transfer pin 56 length and material and the sensor body 54 material and shape.

With the spark plug integrated sensor, the use of a 3 mm long transfer pin 56 may reduce fiber tip 64 temperature by as much as 200° C. in comparison with a combined function diaphragm sensor. Such a temperature drop results from the effect of engine coolant flowing in the spark plug proximity.

A critical requirement for a commercially viable misfire and knock detection system is low cost. While the cost of the diaphragm type sensors above can be very low the total system cost must be acceptably low. When a conventional opto-electronic coupler is used the cost may be unacceptably high because the opto-electronic coupler is the most expensive part of the transceiver.

Such a transceiver comprises one or more light emitting diodes (LEDs) and one or more photodiodes. Presently available bi-directional opto-electronic couplers are unacceptably expensive for low cost automotive applications. LEDs may be also expensive if their beam sizes are small, as typically required for conventional couplers.

Figure 7:
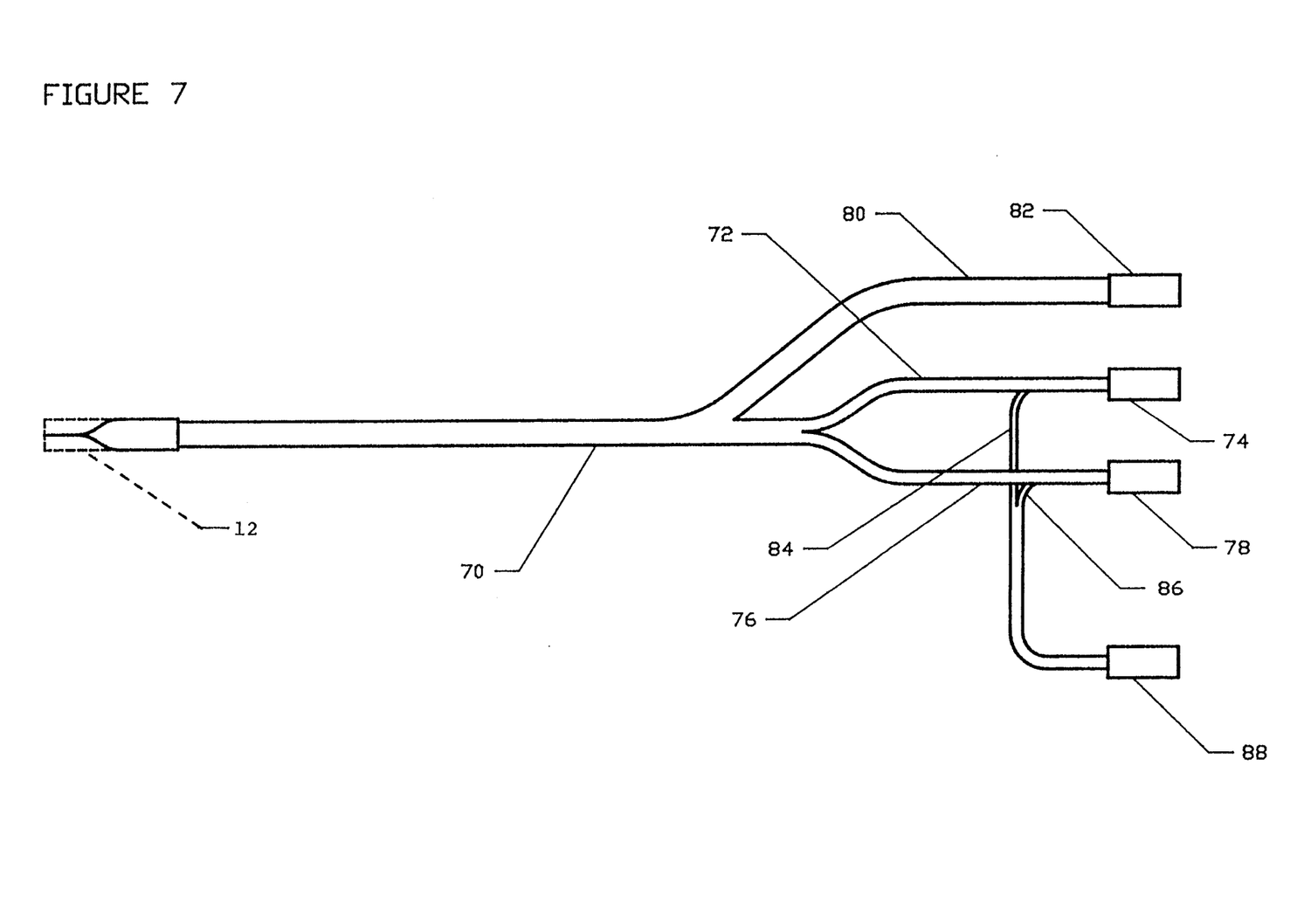
FIG. 7 is an illustration of a distributed fiber optic bundle from the sensor to the sources of light and the detectors.

A low cost and effective solution for the opto-electronic coupler is illustrated in FIG. 7. This solution can offer virtually the same optical power as much more expensive couplers, permits the use of individual low cost LEDs, and individual low cost photodiodes. The basis of the solution is the use of low cost borosilicate fiber bundles tapered or untapered into the diaphragm sensor as explained above and a divisional arrangement of the fibers at the opto-electronic coupler end.

As shown in FIG. 7 the fiber bundle 70 extending from the sensor is divided at the coupler end into dedicated subgroups for each opto-electronic element. For example, eight fibers 72 extend to LED 74 and another eight fibers 76 extend to LED 78. Sixteen fibers 80 extend to the photodiode in the measurement detector 82. Three fibers 84 and 86 from each LED 74 and 78 extend directly to the reference detector 88. With such an arrangement the light from the LEDs is efficiently coupled into the transmitting fiber bundle 70 and into and from the sensor.

As an example, 50 micron borosilicate fibers (extensively used in fiber optics) may be utilized. Depending on LED and sensing fiber sizes, as many as 100 fibers can be used in the transmitting fiber bundle. Alternatively, a larger (150 micron) diameter and fewer fibers can be used. Regardless of the number of fibers, the fibers in the fiber bundle 70 that transmit light from the LEDs and return light to the measurement detector 82 may be fused and tapered at the sensor end to a diameter suitable for the tip end 37 (FIG. 3). Such a taper, which may be fabricated in a straight forward way by thermal fusing of borosilicate fibers and pulling during fusing.

The number of fibers in the subgroups connected to either the LEDs or the photodiodes may be adjusted to optimize the power received by a photodiode. In effect, the number of fibers in each subgroup is determined by the maximum power to be received at the measurement detector 82. The various losses are distributed to obtain maximum received power even though some individual collection efficiencies such as at the LEDs are compromised. Low cost LEDs typically launch divergent and large light beams. Large bundles of fibers can be used to collect the light from the LEDs. With borosilicate fibers having typically high numerical apertures of 0.5 to 0.6, the collection efficiency into a fiber bundle is enhanced. At the tapered end of the fiber bundle, taper loss is reduced by a metal coating over the taper and inside the connector 12.

Figure 8A:
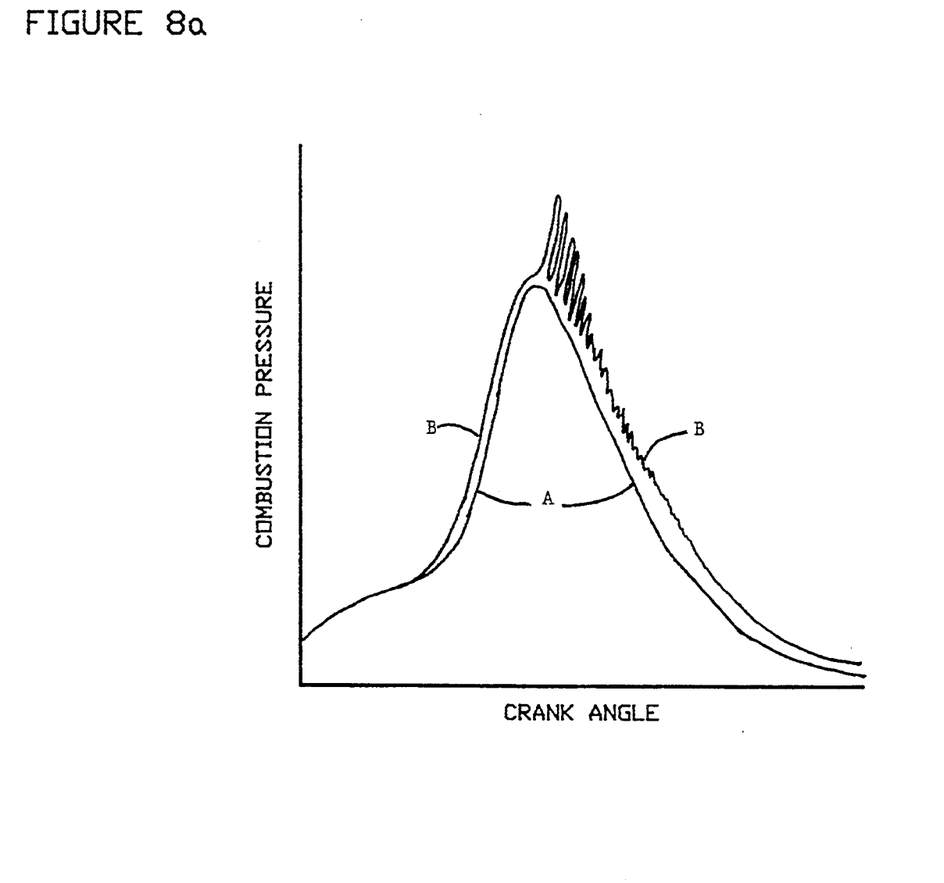
FIGS. 8a and 8b illustrate the effect of knock on the cylinder pressure waveform.
Figure 8B:
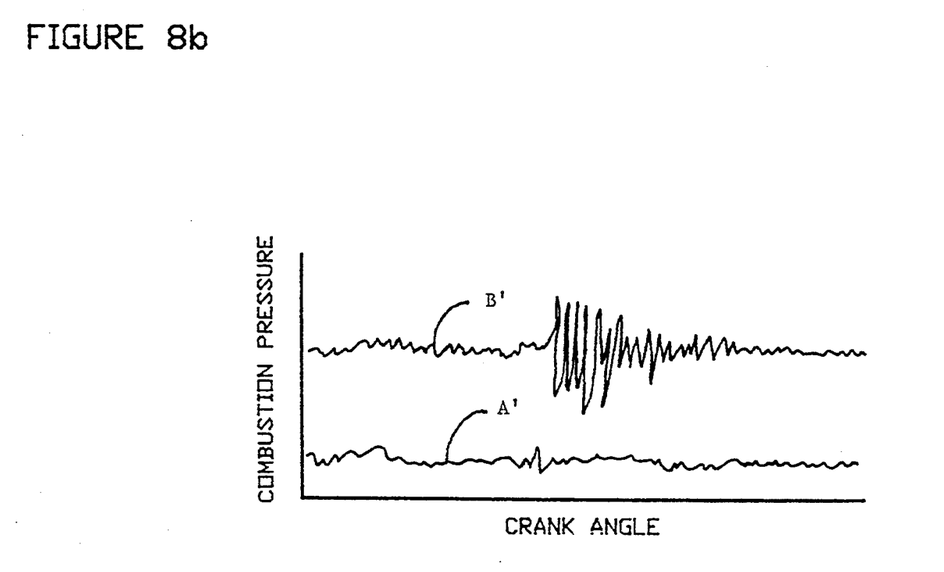
Figure 9A:
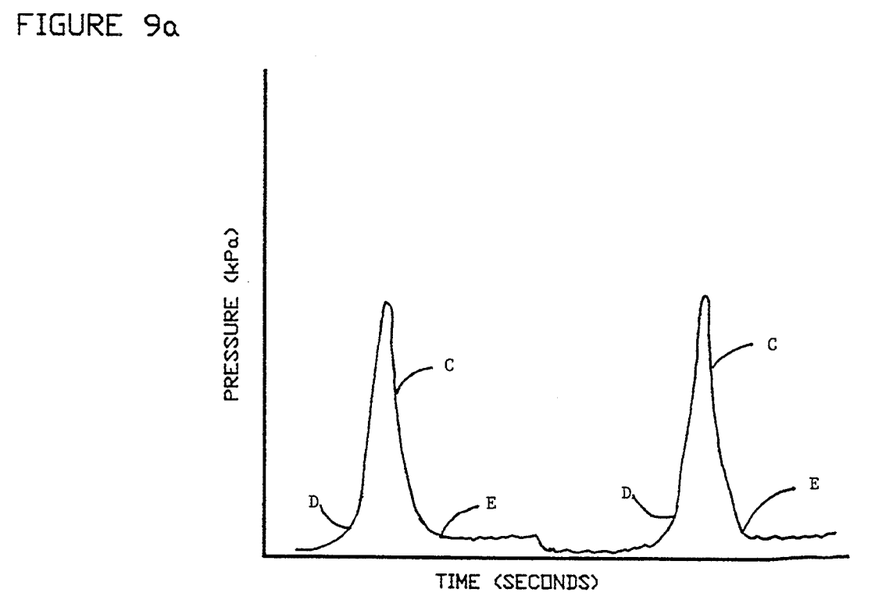
FIGS. 9a and 9b illustrate the effect of misfire on cylinder pressure waveform.
Figure 9B:
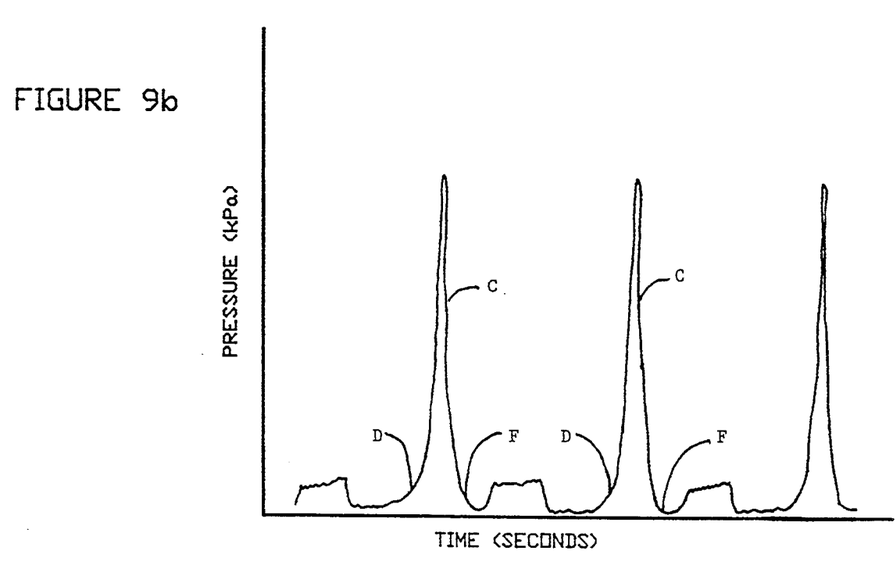

FIGS. 8 and 9 illustrate respectively the superposition of the knock signal on the pressure waveform and the misfire displacement or dip of a portion of the pressure waveform. Thus, in FIG. 8a curve A is the typical or expected waveform for combustion pressure in the cylinder and curve B exhibits the effect of knock on the waveform. Knock clearly causes a relatively high frequency pressure fluctuation which can with suitable electronic analysis in the ECM be isolated and amplified as shown by the comparison of curves A' and B' in FIG. 8b.

In FIG. 9a a multiple pressure waveform for cylinder pressure is illustrated by Curve C. The "knee" at the beginning D and end E of each compression and combustion stroke are substantially similar in shape (substantially symmetric about the peak of curve C). In FIG. 9b, however, the symmetry of curve C about the peak is lost at the "knees". Rather, a pronounced displacement downwardly or dip is exhibited at F in the knee of the curve following the peak.

For knock or misfire detection an autocorrelation technique can uniquely identify knock or misfire. In the absence of knock or misfire, the output of the autocorrelation function applied to the pressure waveform stored in memory in the ECM and the waveform of a particular cylinder results in essentially a zero value. In the presence of knock or misfire, the normalized output of the autocorrelation function approaches unity resulting in the unique detection of either or both of the two combustion anomalies. The physical embodiment of the autocorrelation function can be realized in digital form using Digital Signal Processing integrated circuits which offer the capabilities of sufficiently high speed real time autocorrelation calculations.

I claim:

1. In a fiber optic diaphragm sensor comprising a body having a cavity approximately 3 mm across therein, a diaphragm attached to the body and partially enclosing the cavity, the diaphragm being moveable in response to changes in fluid pressure exerted upon the diaphragm, and
    an optical fiber inserted in the body with the tip end of the optical fiber disposed to inject a light beam into the cavity and receive a reflected light beam,
    the improvement comprising moveable reflective means interposed in the cavity to intercept and reflect back the injected light beam, mechanical means interconnecting the reflective means to the diaphragm whereby movement of the diaphragm in response to changes in fluid pressure activates responsive movement of the reflective means and modulation of the light beam reflected back to the tip end of the optical fiber, said mechanical means interposed between the diaphragm and reflective means to provide a substantial temperature differential between the diaphragm and reflective means when the diaphragm is hot.

2. The fiber optic diaphragm sensor of claim 1 wherein the interconnecting mechanical means leverages movement of the reflective means to magnify the movement of the diaphragm.

3. The fiber optic diaphragm sensor of claim 1 wherein the interconnecting mechanical means is connected to the diaphragm substantially at the location of maximum diaphragm amplitude and to the reflective means at a location substantially spaced from the location of maximum amplitude of the reflective means.

4. The fiber optic diaphragm sensor of claim 1 wherein the reflective means is attached to the body by a fulcrum and the interconnecting mechanical means is connected to the reflective means at a location between the fulcrum and the location at which the light beam is centered on the reflective means.

5. A spark plug and sensor combination comprising a ceramic core and first electrode extending therefrom, a sleeve surrounding the core and a second electrode extending from the sleeve,
    a small bore in the spark plug adjacent the electrodes and a sensor located in the small bore, the sensor comprising a body having a cavity therein, a diaphragm attached to the body and partially enclosing the cavity, the diaphragm being moveable in response to changes in rigid pressure exerted upon the diaphragm,
    optical means to inject a light beam into the cavity and receive a reflected light beam,
    moveable reflective means interposed in the cavity to intercept and reflect back the injected light beam, mechanical means interconnecting the reflective means to the diaphragm to cause movement of the reflective means in concert with movement of the diaphragm, said mechanical means interposed to provide a substantial temperature differential between the diaphragm and reflective means when the diaphragm is hot.

6. The spark plug and sensor combination of claim 5 wherein the interconnecting mechanical means leverages movement of the reflective means to magnify the movement of the diaphragm.

7. The spark plug and sensor combination of claim 5 wherein the ceramic core and first electrode are offset from the center of the spark plug and the small bore is located in the sleeve.

* * * * *